US012595892B2

(12) United States Patent
Tutek

(10) Patent No.: US 12,595,892 B2
(45) Date of Patent: Apr. 7, 2026

(54) ANTI-CONDENSATION PROTECTIVE CAP

(71) Applicant: SERDAR PLASTIK SANAYI VE TICARET A.S., Sincan (TR)

(72) Inventor: Mustafa Serdar Tutek, Sincan (TR)

(73) Assignee: SERDAR PLASTIK SANAYI VE TICARET A.S. (TR)

( * ) Notice: Subject to any disclaimer, the term of this patent is extended or adjusted under 35 U.S.C. 154(b) by 0 days.

(21) Appl. No.: 18/860,716

(22) PCT Filed: Apr. 28, 2022

(86) PCT No.: PCT/TR2022/050391
§ 371 (c)(1),
(2) Date: Oct. 28, 2024

(87) PCT Pub. No.: WO2023/211391
PCT Pub. Date: Nov. 2, 2023

(65) Prior Publication Data
US 2025/0290618 A1 Sep. 18, 2025

(51) Int. Cl.
*F21S 45/33* (2018.01)

(52) U.S. Cl.
CPC .................................... *F21S 45/33* (2018.01)

(58) Field of Classification Search
CPC .................................. F21S 45/33; F21S 45/37
USPC ........................................ 362/294, 373, 547
See application file for complete search history.

(56) References Cited

U.S. PATENT DOCUMENTS

2004/0145899 A1 7/2004 Riebling et al.
2021/0302005 A1 * 9/2021 Lee ......................... F21S 45/50

FOREIGN PATENT DOCUMENTS

CN 208074865 U 11/2018
DE 2405603 A1 8/1975

* cited by examiner

*Primary Examiner* — Thomas M Sember

(57) ABSTRACT

The present invention characterized by being an anti-condensation protective cap that can be mounted on the condensation tape, that electronically transmits to the control system whether a condensation tape is installed under it in the assembly line in a grouped position, and that protects it from external factors by means of the hole outside the condensation area of the tape. By means of the location of the hole, it has the feature of continuing to ventilate from the side of the system even if there is snow, dirt, etc. thereon that will completely cover the hole. It is characterized by the fact that the hole on the protective cap is just an off-axis hole made to electronically monitor/control the presence of the ventilation band.

5 Claims, 6 Drawing Sheets

ANTI-CONDENSATION PROTECTIVE CAP

The present invention relates to an anti-condensation protective cap designed to protect it from external factors, and to electronically control the added condensation tape in order to prevent condensation from forming on the inner surfaces of the frame when it comes into contact with a very cold surface in cases where the hot, moisture loaded air formed during operation comes into contact with a very cold surface in the frame, in the similar devices such as lamps and headlights operating under cold and hot conditions.

The humidity in the interior of similar devices such as lamps and headlights spreads towards the interior with the increase in temperature. When the humidity inside increases and reaches the saturation point, the humidity condenses on the cold parts of the headlight and thus condensation/mist is formed.

The formation of mist causes deterioration such as yellowing of the headlight, darkening of the reflectors, reflecting the light in the headlight and lighting problems in the target area. This can lead to dangerous consequences for users, therefore, preventing condensation in the headlight is very important for safety in all vehicles with headlights in order to see the target area. This protective cap, which is used to protect this tape from external factors, can be controlled electrically on the assembly line by means of the small hole thereon which is outside the condensation area.

TECHNICAL FIELD OF THE INVENTION

The present invention relates to electronically controlling the condensation tape added to prevent condensation that occurs with sudden temperature changes during operation and to protect the tape from external factors during operation in similar devices such as lamps, headlights, which generally operate under cold and hot conditions. The present invention particularly relates to an anti-condensation protective cap system that is shaped to be used in all similar devices/appliances that require vehicle headlights and an anti-condensation system, especially operating in external conditions, and that ensures the anti-condensation tape is protected and successfully fulfill its duty.

STATE OF THE ART

In products with condensation problem, condensation problem occurs when the water vapor in the air changes from the gaseous state to the liquid state as a result of contacting a surface at a lower temperature from the sweating temperature, which depends on the ambient temperature and relative humidity.

If the insulation materials in cold lines are capable of absorbing water, and no measures have been taken against the passage of steam or an impermeable application has not been made, In case using insulation materials with low water vapor diffusion resistance coefficient, although there is no condensation on the surface, water vapor enters the insulation material and becomes water by condensing inside the material. If the amount of condensed water is more than the saturation moisture that the material can absorb, it is released, and it gains movement in the material in various ways, cause condensation, and this condensation may disrupt the structure of the material.

When the condensation tape is left in the open environment, it may be damaged, and when it is protected with a standard protective cap, it cannot be electrically controlled in production.

BRIEF DESCRIPTION OF THE INVENTION

The present invention characterized by being an anti-condensation protective cap that can be mounted on the condensation tape, that electronically transmits to the control system whether a condensation tape is installed under it in the assembly line in a grouped position, and that protects it from external factors by means of the hole outside the condensation area of the tape. By means of the location of the hole, it has the feature of continuing to ventilate from the side of the system even if there is snow, dirt, etc. thereon that will completely cover the hole. It is characterized by the fact that the hole on the protective cap is just an off-axis hole made to electronically monitor/control the presence of the ventilation band. The anti-condensation protective cap is characterized by the fact that it is made of completely recyclable thermoplastic material and can be produced in the desired color. The anti-condensation protective cap made of thermoplastic material covers the condensation tape by placing the protective cap on the specially shaped area above the condensation tape, and thus, it is characterized by keeping the tape resistant to challenging weather conditions, dust, heat, cold, precipitation, and corrosion.

DETAILED DESCRIPTION OF THE INVENTION

The present invention characterized by being an anti-condensation protective cap (1) that can be mounted on the condensation tape (2), that electronically transmits to the control system whether a condensation tape (2) is installed under it in the assembly line in a grouped position, and that protects it from external factors by means of the hole outside the condensation area of the tape.

REFERENCE NUMERALS IN FIGURES

1. Anti-condensation protective cap

2. Condensation Tape

Figure 1:
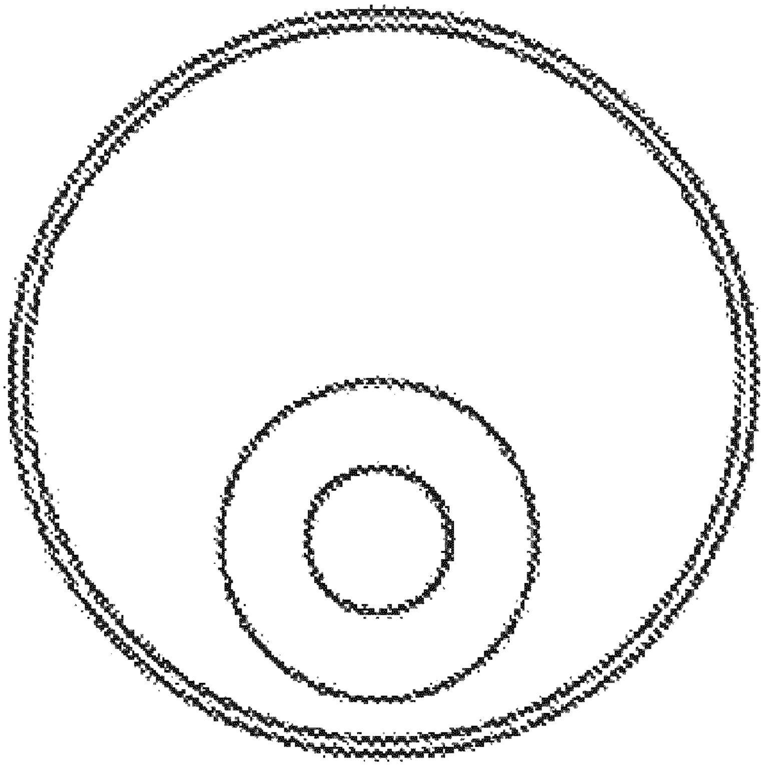
FIG. 1 is the front view of the anti-condensation protective cap
Figure 2:
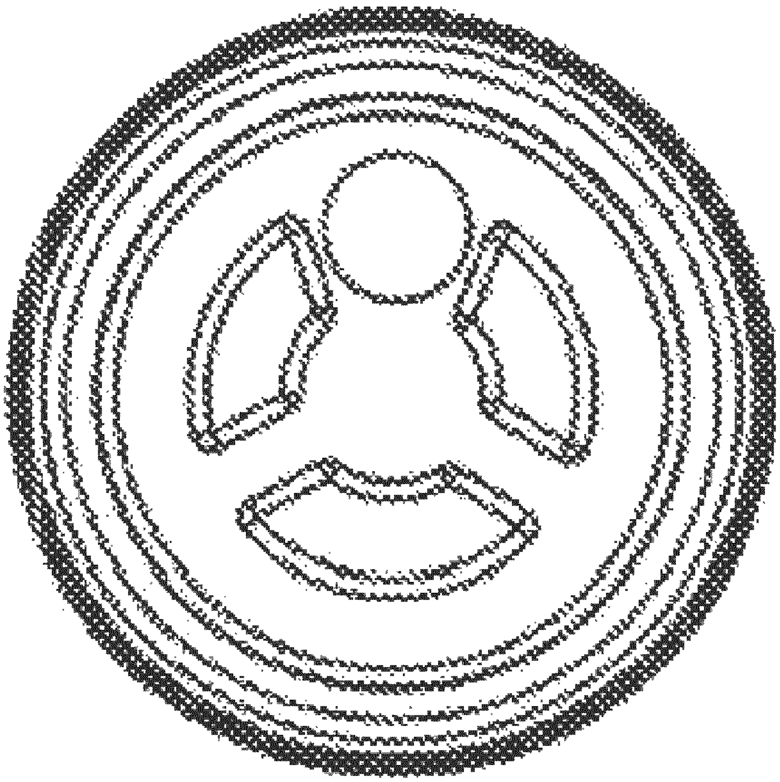
FIG. 2 is the rear view of anti-condensation protective cap.
Figure 3:
FIG. 3 is the side view of anti-condensation protective cap.
Figure 4:
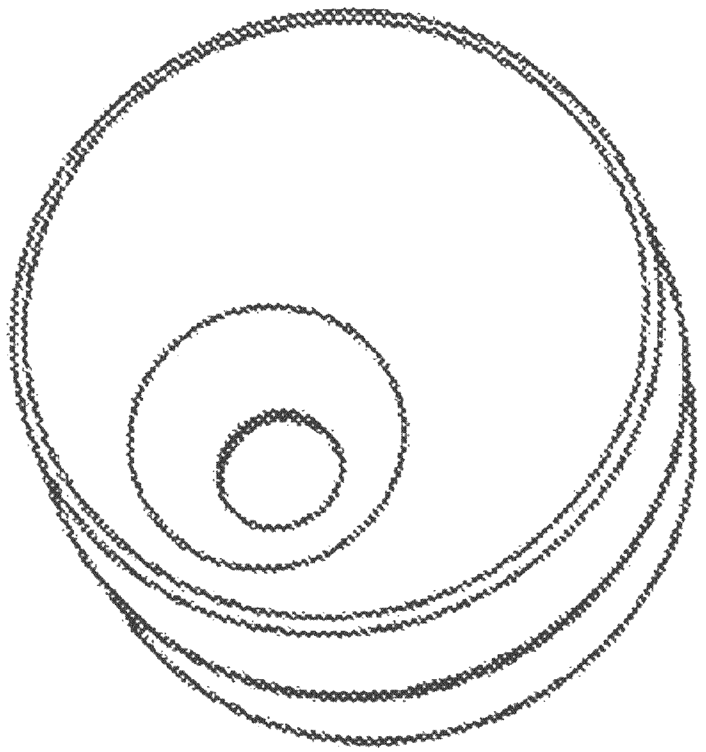
FIG. 4 is the front perspective view of the anti-condensation protective cap.
Figure 5:
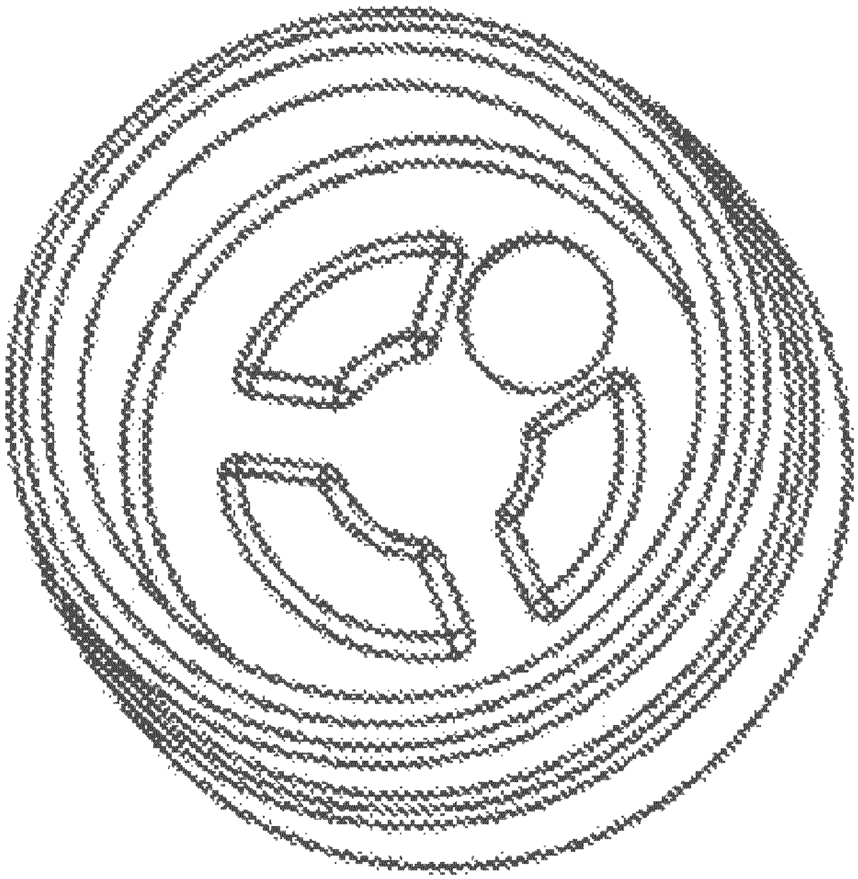
FIG. 5 is the rear perspective view of anti-condensation protective cap.
Figure 6:
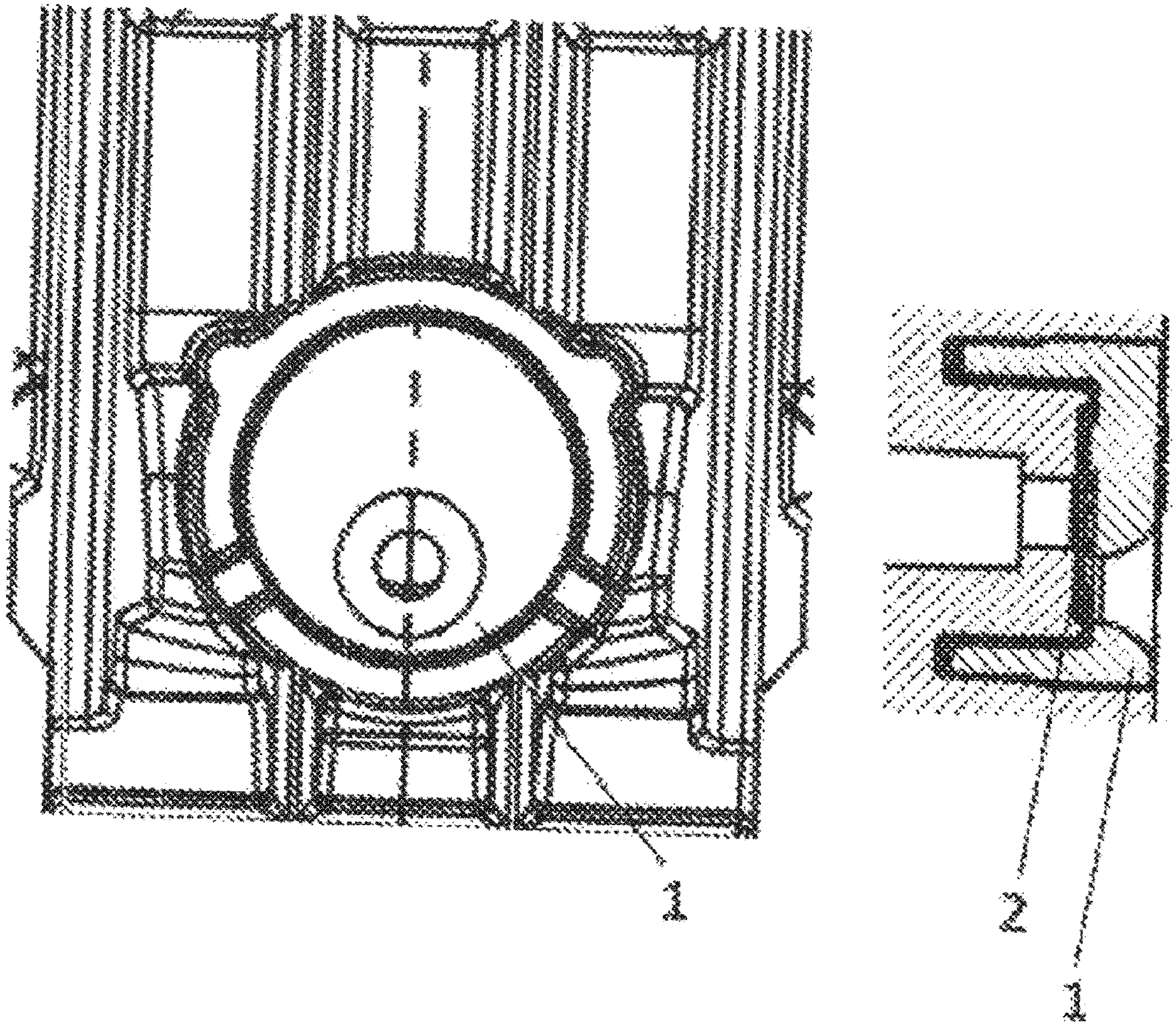
FIG. 6 is the sectional view of anti-condensation protective cap.

It is an anti-condensation protective cap (1) that can be easily installed by means of its special pattern on the surface without the need for a special tool to protect the tapes of the lamps used for condensation against external factors, that can be removed very difficultly without the use of a special tool, and when it is controlled electronically with a digital camera in the automatic assembly line, it is understood whether the condensation tape (2) is in place.

By means of its very fine surface pattern and the elastomer material used, the anti-condensation protective cap (1) has a structure that increases adhesion without the need for extra locking on the surface where it is grouped.

It is an anti-condensation protective cap (1) used to increase the life of the condensation tapes on the lamps and to prevent the condensation tape (2) from being directly exposed to challenging weather conditions, dust, heat, cold, precipitation, corrosion, and to ensure that the condensation tape remains durable and passes the IP69 test. Due to its structure, the system continues to ventilate even if there is snow, dirt, etc. on the lamp by means of the position of the hole, since the ventilation is made from the side and prevents condensation by means of its ribbed structure inside. The anti-condensation protective cap (1) is characterized by the fact that it is made of completely recyclable thermoplastic material and can be produced in the desired color. In order to ensure the long life of the condensation tape on which it is positioned, the anti-condensation protective cap (1), which is made of thermoplastic material that is resistant to outdoor conditions, is characterized by being resistant to challenging weather conditions, dust, temperature, cold, precipitation, and corrosion.

What is claimed is:

1. An anti-condensation protective cap configured to be mounted on a condensation tape, said protective cap comprising:

a circular bottom surface; and a side wall extending away from the bottom surface, wherein, the circular bottom surface and the side wall define an internal cavity;

a plurality of protruding segments are arranged in a circular pattern on the circular bottom surface and are spaced apart;

an off-axis hole provided on the circular bottom surface, the off-axis hole being positioned asymmetrically with respect to a central axis of the circular body and located between two adjacent protruding segments; and at least a portion of the circular bottom surface between the side wall and the plurality of protruding segments comprises of a retaining portion, wherein the retaining portion is configured to receive and hold the condensation tape.

2. The anti-condensation protective cap according to claim 1, wherein the placement of the condensation tape on the retaining portion is verified through a digital camera through the off-axis hole in an automatic assembly line.

3. The anti-condensation protective cap according to claim 1, wherein the off-axis hole is configured to provide ventilation.

4. The anti-condensation protective cap according to claim 1, wherein the ventilation is performed from the side by means of the location of the off-axis hole, by means of the inner part having a feathering structure.

5. The anti-condensation protective cap according to claim 1, wherein the anti-condensation protective cap is made of recyclable thermoplastic material and in desired color.

* * * * *